(12) United States Patent
Chrisp

(10) Patent No.: US 7,414,719 B2
(45) Date of Patent: Aug. 19, 2008

(54) IMAGING SPECTROMETER WIDE FIELD CATADIOPTRIC DESIGN

(75) Inventor: Michael P. Chrisp, Danville, CA (US)

(73) Assignee: Lawrence Livermore National Security, LLC, Livermore, CA (US)

(*) Notice: Subject to any disclaimer, the term of this patent is extended or adjusted under 35 U.S.C. 154(b) by 158 days.

(21) Appl. No.: 11/341,080

(22) Filed: Jan. 26, 2006

(65) Prior Publication Data

US 2007/0171415 A1    Jul. 26, 2007

(51) Int. Cl.
G01J 3/28    (2006.01)
(52) U.S. Cl. ..................................... 356/328
(58) Field of Classification Search ................. 356/305, 356/326, 328, 334
See application file for complete search history.

(56) References Cited

U.S. PATENT DOCUMENTS

| | | | |
|---|---|---|---|
| 5,137,728 | A | 8/1992 | Bawa |
| 5,717,487 | A | 2/1998 | Davies |
| 5,781,290 | A | 7/1998 | Bittner et al. |
| 5,880,834 | A | 3/1999 | Chrisp |
| 6,016,220 | A | 1/2000 | Cook |
| 6,078,048 | A | 6/2000 | Stevens et al. |
| 6,100,974 | A | 8/2000 | Reininger |
| 6,122,051 | A | 9/2000 | Ansley et al. |
| 6,266,140 | B1 | 7/2001 | Xiang et al. |
| 6,388,799 | B1 | 5/2002 | Arnone et al. |
| 6,538,737 | B2 | 3/2003 | Sandstrom et al. |
| 6,922,240 | B2 | 7/2005 | Lerner et al. |
| 2002/0101587 | A1 | 8/2002 | Wilson et al. |
| 2002/0135770 | A1 | 9/2002 | Lewis et al. |
| 2003/0016355 | A1 | 1/2003 | Koike et al. |
| 2004/0156048 | A1 | 8/2004 | Mitchell |
| 2005/0051729 | A1 | 3/2005 | Chrisp |
| 2005/0052647 | A1 | 3/2005 | Lerner |
| 2005/0073680 | A1 | 4/2005 | Chrisp et al. |

FOREIGN PATENT DOCUMENTS

WO    WO 99/63311 A1    12/1999

*Primary Examiner*—F. L Evans
(74) *Attorney, Agent, or Firm*—Eddie E. Scott; John H. Lee

(57) ABSTRACT

A wide field catadioptric imaging spectrometer with an immersive diffraction grating that compensates optical distortions. The catadioptric design has zero Petzval field curvature. The imaging spectrometer comprises an entrance slit for transmitting light, a system with a catadioptric lens and a dioptric lens for receiving the light and directing the light, an immersion grating, and a detector array. The entrance slit, the system for receiving the light, the immersion grating, and the detector array are positioned wherein the entrance slit transmits light to the system for receiving the light and the system for receiving the light directs the light to the immersion grating and the immersion grating receives the light and directs the light through the system for receiving the light to the detector array.

8 Claims, 4 Drawing Sheets

IMAGING SPECTROMETER WIDE FIELD CATADIOPTRIC DESIGN

The United States Government has rights in this invention pursuant to Contract No. W-7405-ENG-48 between the United States Department of Energy and the University of California for the operation of Lawrence Livermore National Laboratory.

CROSS-REFERENCE TO RELATED APPLICATIONS

This application has new improved designs, smaller sizes with wider fields of view compared with those previously given in Patent Application Publication US 2005/0073680 A1, "Imaging Spectrometer Utilizing Immersed Gratings with Accessible Entrance Slit," Chrisp et al publication date Apr. 7, 2005.

BACKGROUND

1. Field of Endeavor

The present invention relates to a spectrometer and more particularly to a compact catadioptric imaging spectrometer designed for a wide field of view with larger format detectors.

2. State of Technology

U.S. Pat. No. 5,717,487 provides the following state of technology information: "A spectrometer is a known instrument for examining the spectral characteristics of light. Light emitted from or reflected by an object is received within the spectrometer and separated into its spectral components, such as the red, green and blue colored spectra as occurs in equal intensity when standard white light is so analyzed. The intensity of each such spectral component of that received light may be readily observed and measured. Each element of nature, molecular components, organic and inorganic compounds, living plants, man, animal and other substances is known to emit a unique spectrum that may be used as an indicium to identify the emitter."

United States Patent Application Serial No. 2002/0135770 published Sep. 26, 2003 provides the following state of technology information: "Imaging spectrometers have been applied to a variety of disciplines, such as the detection of defects in industrial processes, satellite imaging, and laboratory research. These instruments detect radiation from a sample and process the resulting signal to obtain and present an image of the sample that includes spectral and chemical information about the sample."

U.S. Pat. No. 6,078,048 provides the following state of technology information: "In recent years substantial effort has been directed to the problem of detection of airborne chemicals. The remote detection of airborne chemicals issuing from exhaust stacks, vehicle exhaust, and various exhaust flumes or plumes, offers a non-intrusive means for detecting, monitoring, and attributing pollution source terms. To detect, identify, and quantify a chemical effluent, it is highly desirable to operate at the limiting spectral resolution set by atmospheric pressure broadening at approximately 0.1 $cm^{-1}$ This provides for maximum sensitivity to simple molecules with the narrowest spectral features, allows for corrections for the presence of atmospheric constituents, maximizing species selectivity, and provides greater opportunity to detect unanticipated species."

U.S. Pat. No. 5,880,834 provides the following state of technology information: "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a compact imaging spectrometer with an immersive or reflective diffraction grating that compensates optical distortions. The imaging spectrometer comprises an entrance slit for transmitting light, a system with a catadioptric lens and a dioptric lens for receiving the light and directing the light, an immersion grating, and a detector array. The entrance slit, the system for receiving the light, the immersion grating, and the detector array are positioned wherein the entrance slit transmits light to the system for receiving the light and the system for receiving the light directs the light to the immersion grating and the immersion grating receives the light and directs the light through the system for receiving the light to the detector array.

The compact imaging spectrometer uses smaller cryogenic coolers facilitating its using in portable (man carried) gas detection systems and in small unmanned aerial vehicles for remote gas detection. These instruments have application for Homeland Defense to check for the presence of biological or chemical weapons without entering the contaminated areas. These instruments can be used for pollution detection, and remote sensing of agricultural crops, and geological identification. They can also be used for the remote monitoring of industrial processes. The wider field of view of this design enables larger swath widths for the remote sensing of larger areas with single pass overflights and is extensible to take advantage of larger format or mosaiced infrared detector arrays.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims. This invention can be adapted to different spectral regions by suitable choice of refractive and reflective materials, and with different detector arrays.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
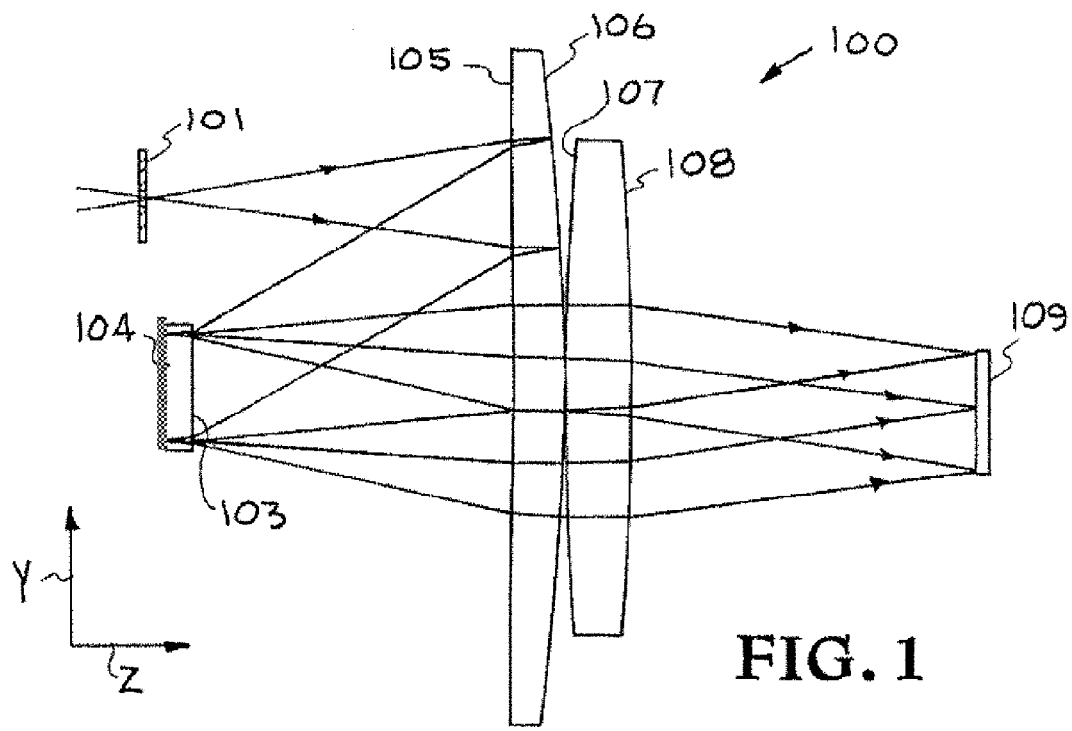
FIG. 1 illustrates an embodiment of a wide field imaging spectrometer constructed in accordance with the present invention using a catadioptric lens and dioptric lens to provide the correction over a detector array with a format of 512 spatial pixels by 256 spectral pixels.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1 of the drawings, an embodiment of a wide field imaging spectrometer constructed in accordance with the present invention is illustrated. This embodiment of the present invention is designated generally by the reference numeral 100. FIG. 1 is a raytrace of the imaging spectrometer 100. The structural elements of the compact imaging spectrometer 100 include an entrance slit 101, a catadioptric lens 105-106, an immersive grating 103-104, a dioptric lens 107-108, and a detector 109.

The light passes from the entrance slit 101 to the catadioptric lens 105-106 refracting through the first surface 105 and reflecting off the back 106 of the lens, which has a continuous convex surface but has a reflective coating on the upper half. The light refracts through the front of the lens 105 and proceeds to the immersive grating 103-104. The light refracts through the front of grating 103 and is then dispersed by the reflective grating on the back surface 104 and refracts out through the front 103 of the grating to catadioptric lens 105-106. This time the light travels through 105-106, and then is focused through lens 107-108 on to the detector array 109. For detector array 109 the spatial dimension is in the X dimension and the spectral dispersion is in the Y dimension. The aperture cold stop is close to surface 103 with the beam from the entrance slit and the exit beam to the detector approximately telecentric. This provides good distortion control for focusing the detector.

Figure 2:
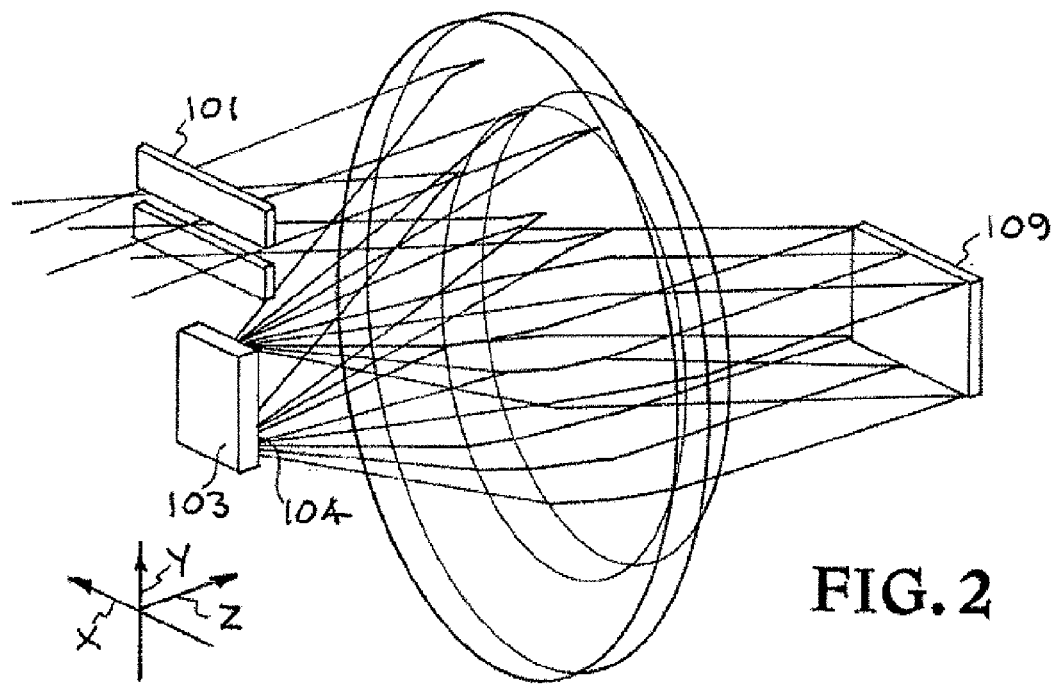
FIG. 2 is an isometric view of an embodiment of a wide field imaging spectrometer constructed in accordance with the present invention using a catadioptric lens and dioptric lens to provide the correction over a detector array with a format of 512 spatial pixels by 256 spectral pixels.

The grating can be generated by a ruling engine, replication, holographically, or by e-beam lithography. Grating 103-104 is tilted and wedged such that the ghost reflections from the front 103 of the grating do not fall on the detector 109. The stray light is also controlled by adjusting the curvature of surface 105 so that the ghost reflection of the light from the entrance slit off surface 105 misses the grating 103-104. The ghost reflection may also be utilized by an additional detector. FIG. 2 is an isometric view of the spectrometer shown in FIG. 1.

The imaging spectrometer 100 has been designed to the requirements in Table 1 and is diffraction limited over the wavelength range with excellent spatial and spectral resolutions.

TABLE 1

| | |
|---|---|
| Spectral Range | 7.5-13.5 microns |
| F-number (round or square) | 3.5 |
| Detector array | 512 spatial × 256 spectral |
| Pixel Size | 40 microns |
| Entrance Slit Length | 20.48 mm |
| Spatial Distortion: (change in Spatial Mapping with Wavelength) | <0.1 pixel (<±2 microns) |
| Spectral Distortion: Spectral Smile | <0.1 pixel (<±2 microns) |
| Optical Performance | Diffraction Limited |
| Ghosting | <0.1% of the primary image |

The spectral slit curvature has been corrected to less than one tenth of a pixel over the detector array. This is the curvature of slit image on the detector 109 at a single wavelength, which is a common problem with imaging spectrometer designs. The spatial mapping distortion has also been corrected to less than one tenth of a pixel over the full wavelength range, so the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects. The nominal design has much better distortion correction than the requirements in the Table 1.

One important feature of this design, enabling it to be used over a wide field of view than previous designs (Patent Application Publication US 2005/0073680 A1, "Imaging Spectrometer Utilizing Immersed Gratings with Accessible Entrance Slit," Chrisp et al publication date Apr. 7, 2005), is that it has zero Petzval field curvature. The field curvature from the positive mirror section is of opposite sign and cancels with the field curvature sum from the rest of the positive refractive surfaces.

The optical prescription for the imaging spectrometer in FIG. 1 is given

TABLE 2

Optical Prescription

| FIG. 1 reference | Surface notes | Y (mm) | Z (mm) | X angle (degrees) | Radius (mm) |
|---|---|---|---|---|---|
| 101 | slit | 16.67 | −32.71 | | |
| 105 | 1st lens front surface | 0 | 0 | 0 | 1409.222 cc |
| 106 | 1st lens mirror/back surface | 0 | 4.5 | 0 | 226.702 cx |
| 107 | 2nd lens front surface | 0 | 4.6 | 0 | 293.872 cx |
| 108 | 2nd lens back surface | 0 | 10.6 | 0 | 301.896 cx |
| 103 | grating front surface | −0.13 | −28.37 | 0.072 | aspheric |
| 104 | grating ruled surface | −0.14 | −30.77 | −0.616 | flat |
| 109 | detector surface | −2.14 | 41.35 | −0.429 | flat |

(global surface coordinates with respect to first lens 105)

in TABLE 2, where cc stands for a concave surface and cx is a convex surface. The origin of the global coordinate system is at the center of the lens front face 105, and positive X rotation angles are anti-clockwise about the X axis. The lenses 105-106 and 107-108, and grating 103-104 are made from germanium; the grating period is 0.0194 mm. The sagittal equation of the fourth order rotationally symmetric asphere on grating surface 103 is given by:

$$z = 0.126E-5(x^2+y^2)^2$$

This is an example of a typical design prescription, and the dimensions are given at an operational temperature of approximately 50K.

Small size for an infrared imaging spectrometer is extremely important because it determines the requirements for the cryogenic cooling. For example, if the spectrometer is small it can fly in a small UAV. Also, if the spectrometer is small it is person portable. The imaging spectrometer 100 has a size envelope that is smaller than spectrometers currently in use for its wide field. The entrance slit 101, catadioptric lens 105-106, dioptric lens 107-108, immersion grating 103-104, and detector 109 fit within the envelope. The Y axis and the Z axis are shown in the plane of the paper in FIG. 1. The X axis extends perpendicular to both the Y axis and the Z axis. The envelope is a cylinder 6 cm diameter by 7.5 cm long. As shown in FIG. 1, the X axis is 6 cm, the Y axis is 6 cm, and the Z axis is 7.5 cm. The entrance slit 101 is located at or near the front and detector 109 is located at or near the back.

Figure 3:
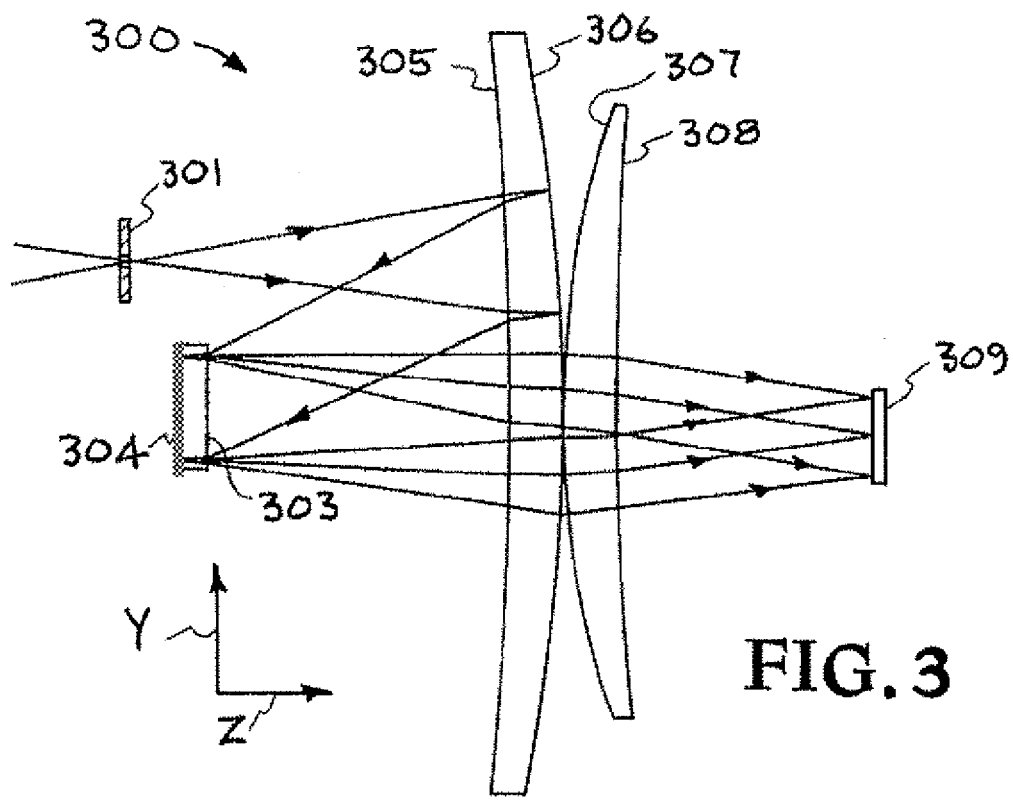
FIG. 3 illustrates an embodiment of a very wide field imaging spectrometer constructed in accordance with the present invention using a catadioptric lens and a dioptric lens to provide the correction over a detector array with a format of 1024 spatial pixels by 256 spectral pixels.
Figure 4:
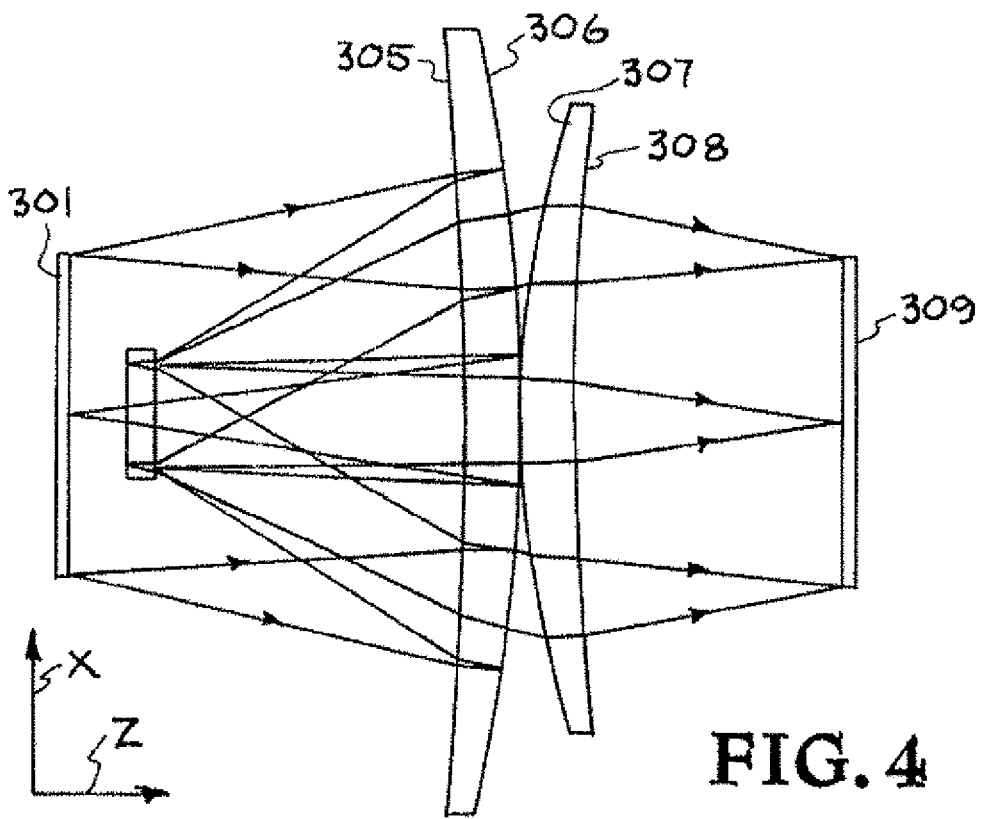
FIG. 4 is a plan view of an embodiment of a very wide field imaging spectrometer constructed in accordance with the present invention using a catadioptric lens and dioptric lens to provide the correction over a detector array with a format of 1024 spatial pixels by 256 spectral pixels.

Referring now to FIG. 3 of the drawings, an embodiment of a very wide field imaging spectrometer constructed in accordance with the present invention is illustrated. This embodiment of the present invention is designated generally by the reference numeral 300. FIG. 3 is a raytrace of the imaging spectrometer 300. The structural elements of the compact imaging spectrometer 300 include an entrance slit 301, a catadioptric lens 305-306, an immersive grating 303-304, a dioptric lens 307-308, and a detector 309. FIG. 4 is a plan view of the spectrometer shown in FIG. 3 as a cross-sectional view.

The light passes from the entrance slit 301 to the catadioptric lens 305-306 refracting through the first surface 305 and reflecting off the back 306 of the lens, which has a continuous convex surface but has a reflective coating on the upper half. The light refracts through the front of the lens 305 and proceeds to the immersive grating 303-304. The light refracts through the front of grating 303 and is then dispersed by the reflective grating on the back surface 304 and refracts out through the front of the grating 303 to catadioptric lens 305-306. This time the light travels through 305-306, and then is focused through lens 307-308 and on to the detector array 309. For detector array 309 the spatial dimension is in the X dimension and the spectral dispersion is in the Y dimension. The aperture cold stop is close to surface 303 with the beam from the entrance slit and the exit beam to the detector approximately telecentric. The grating can be generated by a ruling engine, replication, holographically, or by e-beam lithography. Grating 303-304 is tilted and wedged such that the ghost reflections from the front 303 of the grating do not fall on the detector 309.

The imaging spectrometer 300 has been designed to the requirements in Table 3 and is diffraction limited over the wavelength range with excellent spatial and spectral resolutions.

TABLE 3

| | |
|---|---|
| Spectral Range | 7.5-13.5 microns |
| F-number (square or round) | 3.5 |
| Detector array | 1024 spatial × 256 spectral |
| Pixel Size | 40 microns |
| Entrance Slit Length | 40.96 mm |
| Spatial Distortion: (change in Spatial Mapping with Wavelength) | <0.1 pixel (<±2 microns) |
| Spectral Distortion: Spectral Smile | <0.1 pixel (<±2 microns) |
| Optical Performance | Diffraction Limited |
| Ghosting | <0.1% of the primary image |

The spectral slit curvature has been corrected to less than one tenth of a pixel over the detector arrays. This is the curvature of slit image on the detector 309 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects. The nominal design has much less distortion than the numbers in Table 3.

One important feature of this design enabling it to be used over a wide field of view than previous designs (Patent Application Publication US 2005/0073680 A1, "Imaging Spectrometer Utilizing Immersed Gratings with Accessible Entrance Slit," Chrisp et al publication date Apr. 7, 2005), is that it has zero Petzval field curvature. The field curvature from the positive mirror section is of opposite sign and cancels with the field curvature sum from the rest of the positive refractive surfaces.

Small size for an infrared imaging spectrometer is extremely important because it determines the requirements for the cryogenic cooling. For example, if the spectrometer is small it can fly in a small UAV. The imaging spectrometer 300 has a size envelope that is extremely efficient given the 1024 spatial pixel width. The entrance slit 301, catadioptric lens 305-306, dioptric lens 307-308, immersion grating 303-304, and detector 309 fit within the envelope. The Y axis and the Z axis are shown in the plane of the paper in FIG. 3. The X axis extends perpendicular to both the Y axis and the Z axis. As shown in FIG. 3, the X axis is 9 cm, the Y axis is 6 cm, and the Z axis is 10 cm. The entrance slit 301 is located at or near the front and the detector 309 is located at or near the back.

Figure 5:
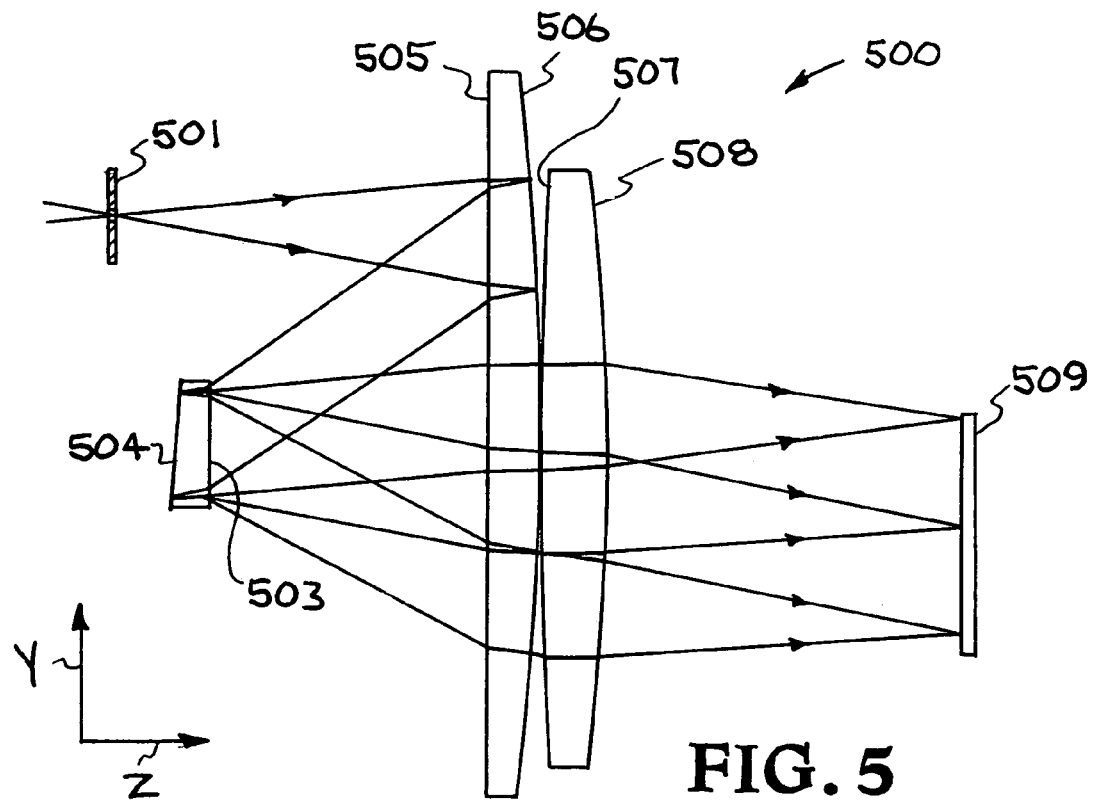
FIG. 5 illustrates an embodiment of an imaging spectrometer constructed in accordance with the present invention using a catadioptric lens and a dioptric lens to provide the correction over a detector array with a format of 256 spatial pixels by 256 spectral pixels.
Figure 6:
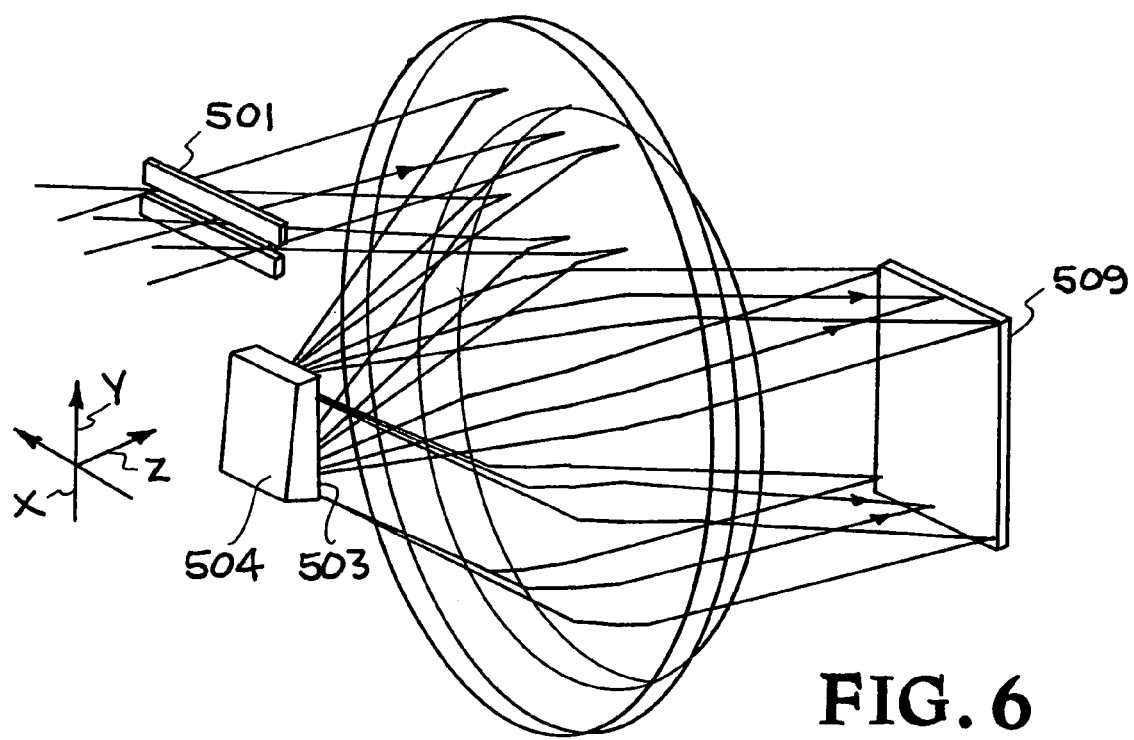
FIG. 6 is an isometric view of an embodiment of an imaging spectrometer constructed in accordance with the present invention using a catadioptric lens and dioptric lens to provide the correction over a detector array with a format of 256 spatial pixels by 256 spectral pixels.

Referring now to FIG. 5 of the drawings, an embodiment of a very compact imaging spectrometer constructed in accordance with the present invention is illustrated. This embodiment of the present invention is designated generally by the reference numeral 500. FIG. 5 is a raytrace of the imaging spectrometer 500. The structural elements of the compact imaging spectrometer 500 include an entrance slit 501, a catadioptric lens 505-506, a dioptric lens 507-508, an immersive grating 503-504, and a detector 509. FIG. 6. is an isometric view of the spectrometer shown in FIG. 5 as a cross-sectional view.

The light passes from the entrance slit 501 to the catadioptric lens 505-506 refracting through the first surface 505 and reflecting off the back 506 of the lens, which has a continuous convex surface but has a reflective coating on the upper half. The light refracts through the front of the lens 505 and proceeds to the immersive grating 503-504. The light refracts through the front of grating 503 and is then dispersed by the reflective grating on the back surface 504 and refracts out through the front of the grating 503 to catadioptric lens 505-506. This time the light travels through 505-506, and then is focused through lens 507-508 and on to the detector array 509. For detector array 509 the spatial dimension is in the X dimension and the spectral dispersion is in the Y dimension. The aperture cold stop is close to surface 503 with the beam from the entrance slit and the exit beam to the detector approximately telecentric.

The grating can be generated by a ruling engine, replication, holographically, or by e-beam lithography. Grating 503-504 is tilted and wedged such that the ghost reflections from the front 503 of the grating do not fall on the detector 509. The imaging spectrometer 500 has been designed to the requirements in Table 4 and is diffraction limited over the wavelength range with excellent spatial and spectral resolutions.

TABLE 4

| | |
|---|---|
| Spectral Range | 7.5-13.5 microns |
| F-number (square or round) | 3.5 |
| Detector array | 256 spatial × 256 spectral |
| Pixel Size | 40 microns |
| Entrance Slit Length | 10.24 mm |
| Spatial Distortion: (change in Spatial Mapping with Wavelength) | <0.1 pixel (<±2 microns) |
| Spectral Distortion: Spectral Smile | <0.1 pixel (<±2 microns) |
| Optical Performance | Diffraction Limited |
| Ghosting | <0.1% of the primary image |

The spectral slit curvature has been corrected to less than one tenth of a pixel over the detector arrays. This is the curvature of slit image on the detector 509 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects.

One important feature of this design compared with previous designs (Patent Application Publication US 2005/0073680, "Imaging Spectrometer Utilizing Immersed Gratings with Accessible Entrance Slit," Chrisp et al publication date Apr. 7, 2005), is that it has zero Petzval field curvature. The field curvature from the positive mirror section is of opposite sign and cancels with the field curvature sum from the rest of the positive refractive surfaces.

Small size for an infrared imaging spectrometer is extremely important because it determines the requirements for the cryogenic cooling. For example, if the spectrometer is small it can fly in a small UAV. The imaging spectrometer 500 has a size envelope that is extremely efficient given the 256 spatial pixel width. The entrance slit 501, catadioptric lens 505-506, dioptric lens 507-508, immersion grating 503-504, and detector 509 fit within the envelope. The Y axis and the Z axis are shown in the plane of the paper in FIG. 5. The X axis extends perpendicular to both the Y axis and the Z axis. As shown in FIG. 5, the X axis is 3.4 cm, the Y axis is 3.4 cm, and the Z axis is 4 cm. The entrance slit 501 is located at or near the front and the detector 509 is located at or near the back.

Figure 7:
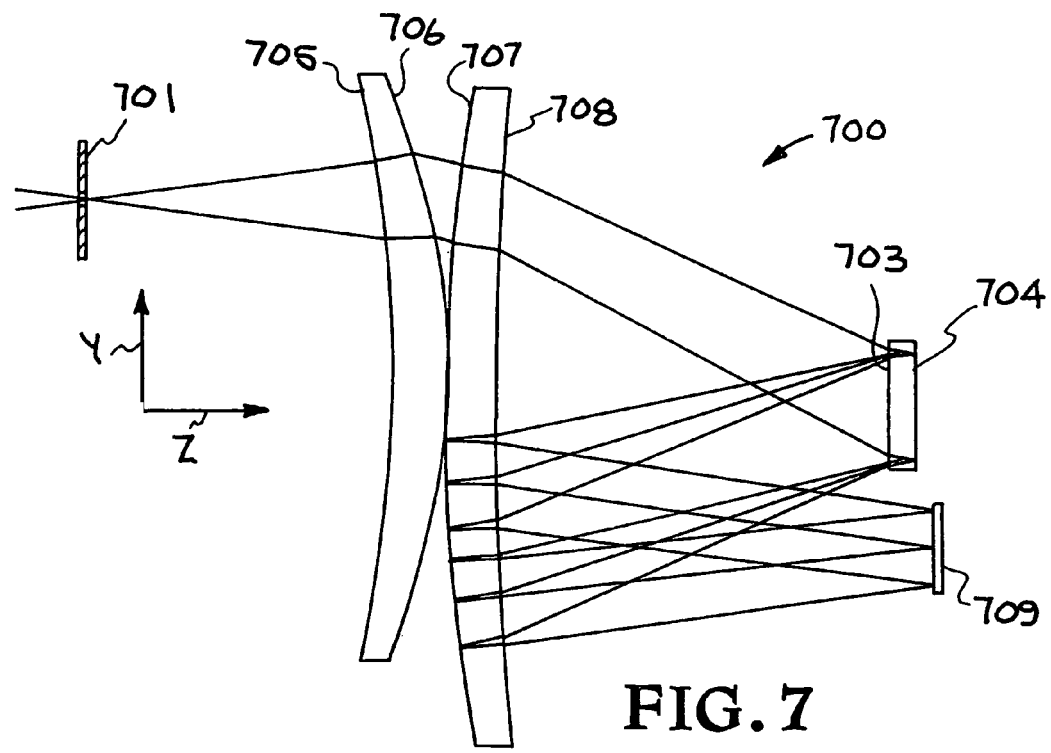
FIG. 7 illustrates an embodiment of a wide field imaging spectrometer constructed in accordance with the present invention using a catadioptric lens and a dioptric lens to provide the correction over a detector array with a format of 1024 spatial pixels by 256 spectral pixels. In this case the optical design has been reversed to reflect from the catadioptric lens immediately before the detector.

Referring now to FIG. 7 of the drawings, an embodiment of a wide field imaging spectrometer constructed in accordance with the present invention is illustrated. In this case the optical design has a reverse form compared with the previous cases. This embodiment of the present invention is designated generally by the reference numeral 700. FIG. 7 is a raytrace of the imaging spectrometer 700. The structural elements of the compact imaging spectrometer 700 include an entrance slit 701, a dioptric lens 705-706, an immersive grating 703-704, a catadioptric lens 707-708, and a detector 709.

The light passes from the entrance slit 701 through the dioptric lens 705-706 and then through the non-reflecting section of the catadioptric lens 707-708, proceeding to the immersive grating 703-704. The light refracts through the front of grating 703 and is then dispersed by the reflective grating on the back surface 704, and refracts out through the front of the grating 703 to catadioptric lens 707-708. This time the light travels through the surface 708 and is reflected of the back surface 707, which has a reflective coating on the lower part. The light refracts through surface 708 and focuses onto the detector array 709. For detector array 709 the spatial dimension is in the X dimension and the spectral dispersion is in the Y dimension. The aperture cold stop is close to surface 703 with the beam from the entrance slit and the exit beam to the detector approximately telecentric.

Figure 8:
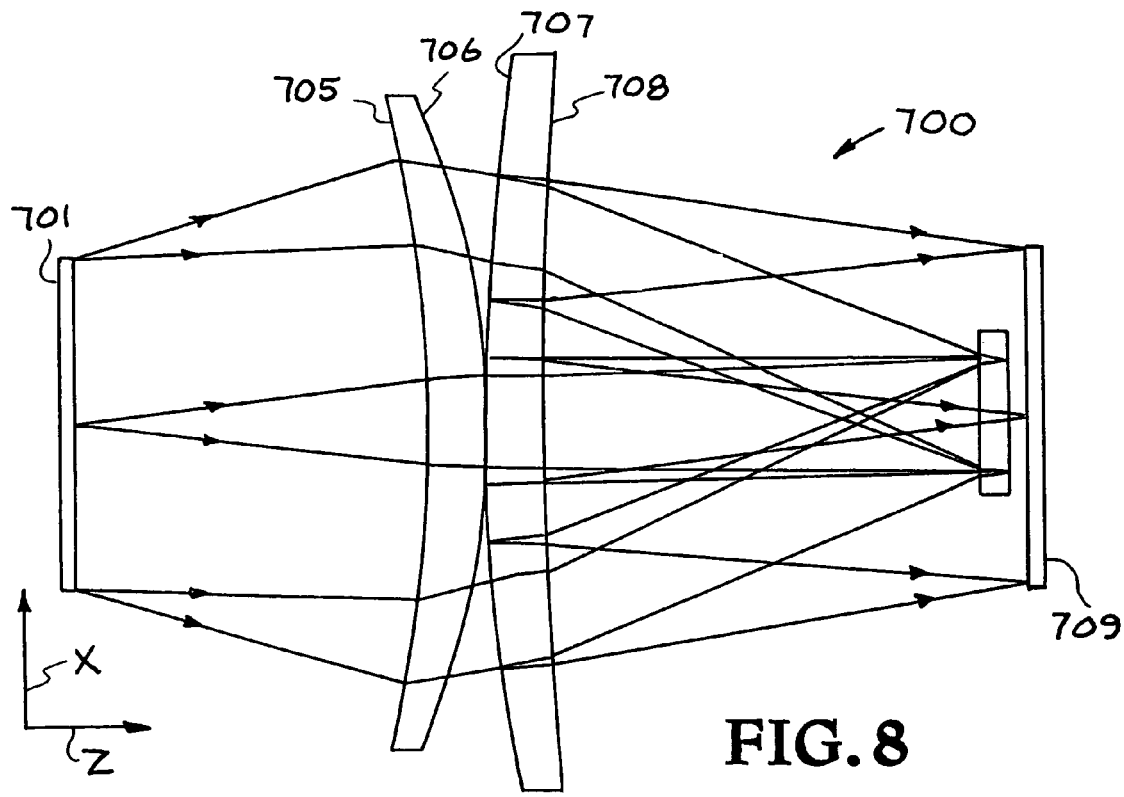
FIG. 8 is a plan view of an embodiment of a wide field imaging spectrometer constructed in accordance with the present invention using a catadioptric lens and a dioptric lens to provide the correction over a detector array with a format of 1024 spatial pixels by 256 spectral pixels. In this case the optical design has been reversed to reflect off the catadioptric lens immediately before the detector.

The grating can be generated by a ruling engine, replication, holographically, or by e-beam lithography. Grating 703-704 is tilted and wedged such that the ghost reflections from the front 703 of the grating do not fall on the detector 709. FIG. 8 is a plan view of the spectrometer shown in FIG. 7 as a cross-sectional view.

The imaging spectrometer 700 has been designed to the requirements in Table 3 and is diffraction limited over the wavelength range with excellent spatial and spectral resolutions.

The spectral slit curvature has been corrected to less than one tenth of a pixel over the detector arrays. This is the curvature of slit image on the detector 709 at a single wavelength, which is a common problem with imaging spectrometer designs. The spatial mapping distortion has also been corrected to less than one tenth of a pixel over the full wavelength range. This means that the spectrum from a single point in the entrance slit will not wander from the center of a row of pixels by less than ±2 microns. Correcting the spectral slit curvature and the spatial mapping distortion with wavelength to less than one tenth of a pixel ensures that the images do not have to be resampled to correct for these effects.

One important feature of this design enabling it to be used over a wide field of view than previous designs is that it has zero Petzval field curvature. The field curvature from the positive mirror section is of opposite sign and cancels with the field curvature sum from the rest of the positive refractive surfaces.

Small size for an infrared imaging spectrometer is extremely important because it determines the requirements for the cryogenic cooling. For example, if the spectrometer is small it can fly in a small UAV. The imaging spectrometer 700 has a size envelope that is extremely efficient given the 1024 spatial pixel width. The entrance slit 701, catadioptric lens 705-706, dioptric lens 707-708, immersion grating 703-704, and detector 709 fit within the envelope. The Y axis and the Z axis are shown in the plane of the paper in FIG. 7. The X axis extends perpendicular to both the Y axis and the Z axis. As shown in FIG. 7, the X axis is 8 cm, the Y axis is 9 cm, and the Z axis is 12 cm. The entrance slit 701 is located at or near the front and the detector 709 is located at or near the back.

The imaging spectrometer of the present invention has many uses. Examples of its use include use in Homeland Defense to check for the presence of biological or chemical weapons without entering the contaminated areas. The imaging spectrometer also has use for commercial remote sensing where portability is important. The imaging spectrometer can be used for pollution detection and remote sensing of agricultural crops. It can be used for geological identification and for the remote monitoring of industrial processes. These are examples of the various potential applications of the imaging spectrometer of the present invention.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A wide field imaging spectrometer apparatus, comprising:
   an entrance slit for transmitting light,
   a catadioptric lens,
   a dioptric lens,
   an immersion grating, and
   a detector array,
   said entrance slit, said catadioptric lens, said dioptric lens, said immersion grating, and said detector array are positioned wherein
   said entrance slit transmits light to said catadioptric lens, said catadioptric lens refracts and reflects said light to said immersion grating, and said immersion grating disperses and directs said light to said catadioptric lens, said catadioptric lens transmits and refracts light to said dioptric lens, said dioptric lens focuses and directs light to said detector array.

2. The wide field imaging spectrometer apparatus of claim 1 wherein said immersion grating includes unequally spaced grooves or curved grooves, or both unequally spaced grooves and curved grooves.

3. The wide field imaging spectrometer apparatus of claim 1 wherein said immersion grating includes a general aspheric surface.

4. The wide field imaging spectrometer apparatus of claim 1 wherein said immersion grating includes a reflective grating.

5. A wide field imaging spectrometer apparatus, comprising:
   an entrance slit for transmitting light,
   a dioptric lens,
   a catadioptric lens,
   an immersion grating, and
   a detector array,
   said entrance slit, said catadioptric lens, said dioptric lens, said immersion grating, and said detector array are positioned wherein
   said entrance slit transmits light to said dioptric lens, said dioptric lens transmits light to said catadioptric lens, said catadioptric lens refracts said light to said immersion grating, and said immersion grating disperses and directs said light to said catadioptric lens, said catadioptric lens transmits and reflects said light to said detector array.

6. The wide field imaging spectrometer apparatus of claim 5 wherein said immersion grating includes unequally spaced grooves or curved grooves, or both unequally spaced grooves and curved grooves.

7. The wide field imaging spectrometer apparatus of claim 5 wherein said immersion grating includes a general aspheric surface.

8. The wide field imaging spectrometer apparatus of claim 5 wherein said immersion grating includes a reflective grating.

* * * * *